Sept. 13, 1932.  W. F. MacGREGOR  1,877,519
HARVESTER
Filed June 17, 1930  2 Sheets-Sheet 1
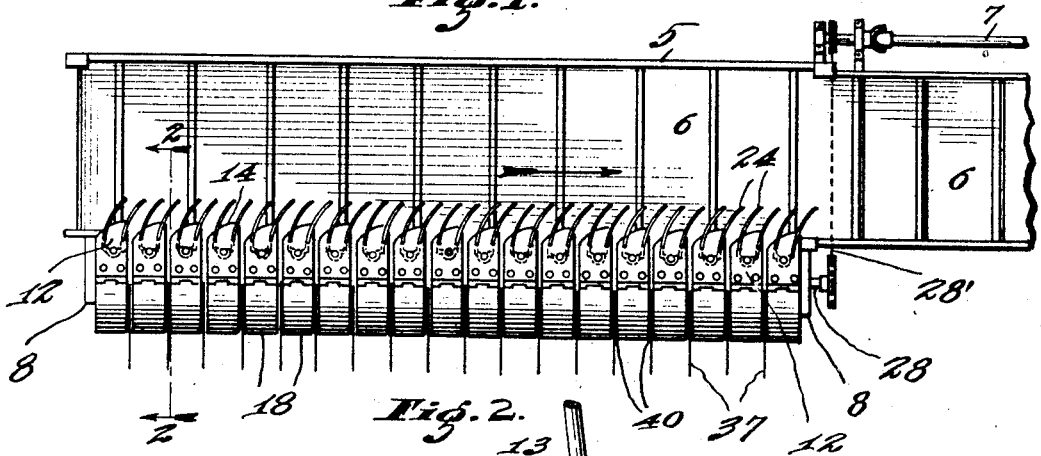
Fig. 1.
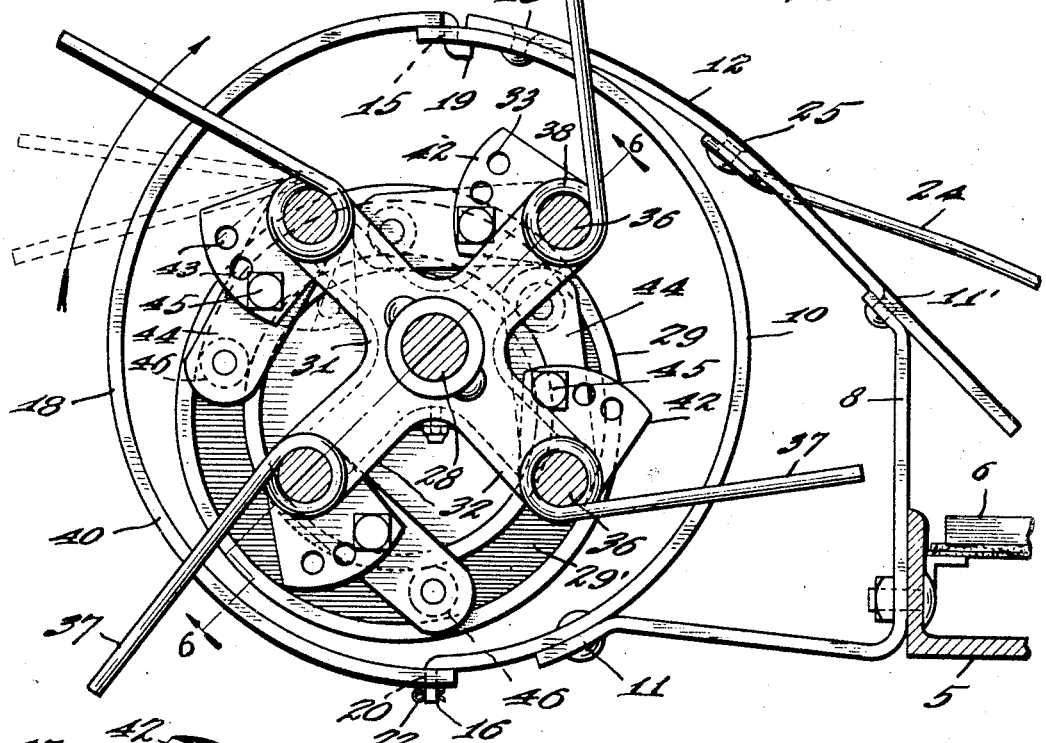
Fig. 2.
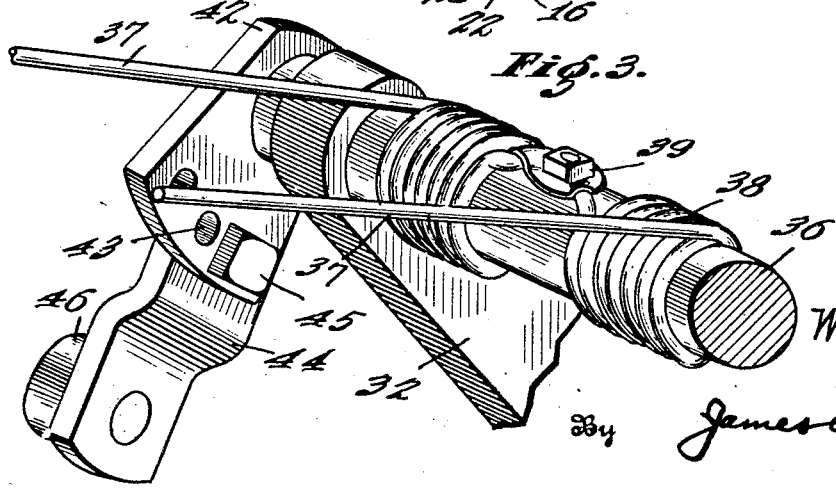
Fig. 3.
Inventor
WALLACE F. MacGREGOR,
By James A. Walsh.
Attorney Sept. 13, 1932.                W. F. MacGREGOR                1,877,519
                                  HARVESTER
                             Filed June 17, 1930         2 Sheets-Sheet 2
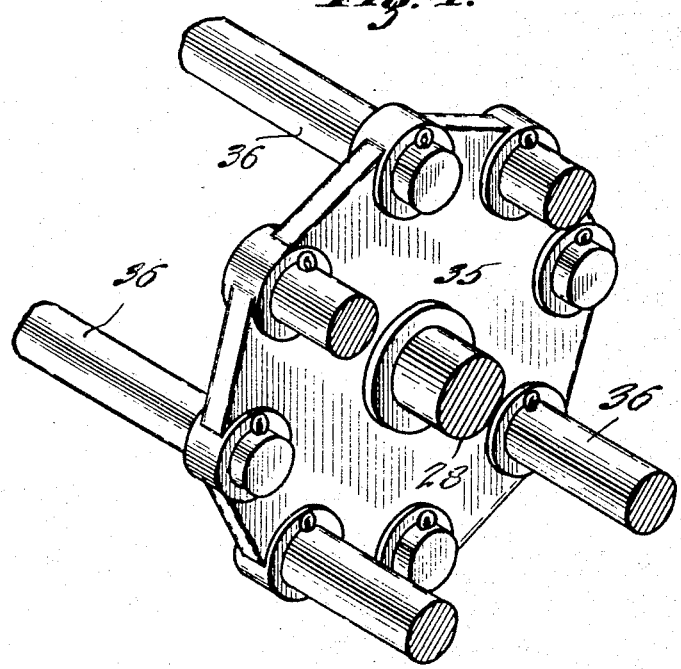
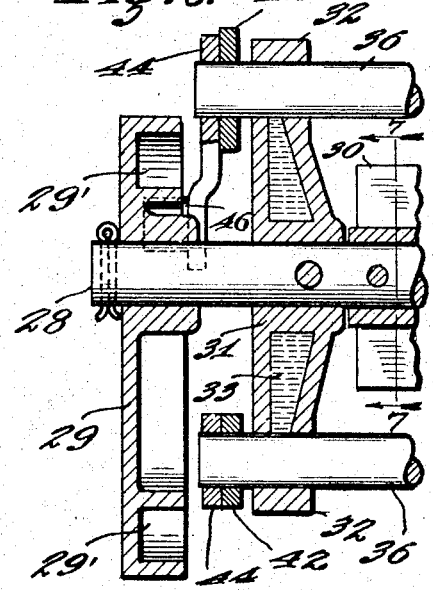
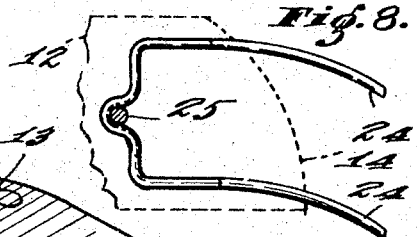
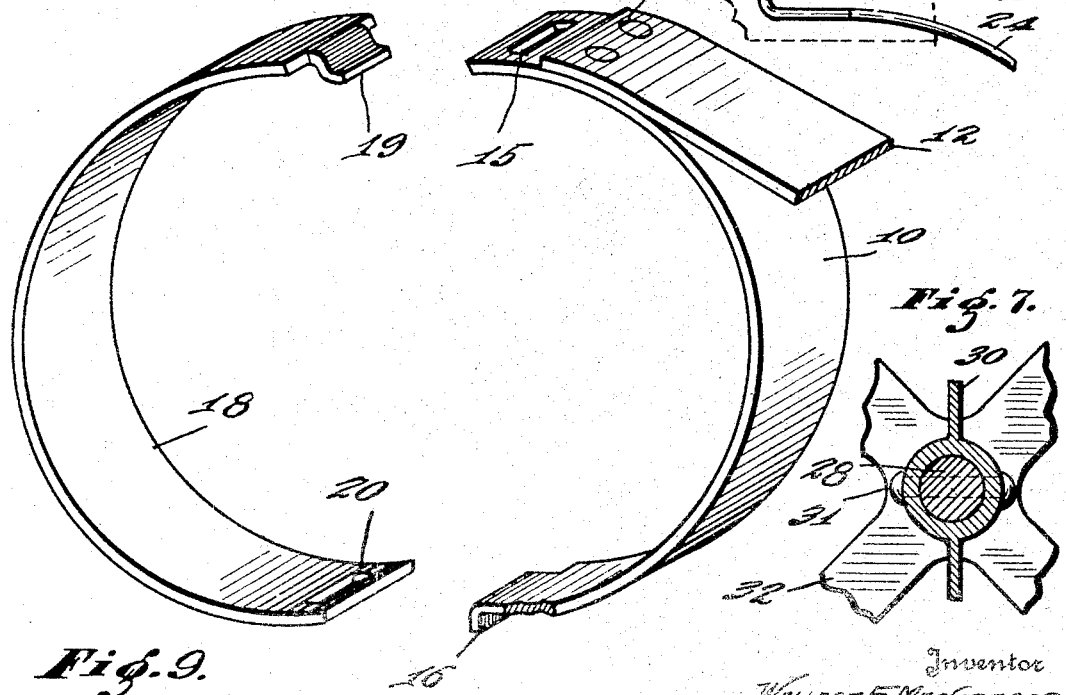
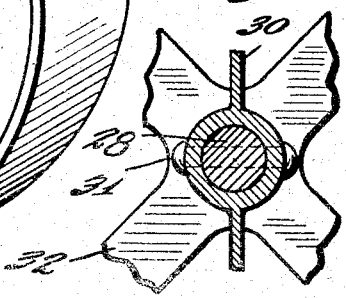

Patented Sept. 13, 1932

1,877,519

UNITED STATES PATENT OFFICE

WALLACE F. MacGREGOR, OF RACINE, WISCONSIN, ASSIGNOR TO J. I. CASE COMPANY, OF RACINE, WISCONSIN, A CORPORATION

HARVESTER

Application filed June 17, 1930. Serial No. 461,785.

In localities where grain does not ripen uniformly, or dry out sufficiently after thrashing to be properly preserved, it is the practice to cut the standing grain and deposit it in windrows on the stubble to dry out and thoroughly mature, after which it is gathered from the windows by a pick-up attached to a header in a well known manner and conveyed by the latter into a complementary machine and thrashed and separated. In the type of pick-up attachments commonly used the fingers or tines are so designed and arranged as to have a certain unadjustable inclination or fixed pitch in relation to the ground, and in practice it has been demonstrated that such a pick-up will be of greater efficiency when provided with fingers which may be readily adjustable so that their relative inclination to the ground may be varied according to crop conditions.

The object of my invention is to provide a harvester attachment of the character described having fingers which may be readily adjusted to meet varying field conditions, as when picking up long tangled vines and straw which are apt to wind up in such mechanism, or when gathering heads of grain with short straws which are difficult to pick up but not likely to wind; a further object being to facilitate the assemblage of the pick-up attachment when under construction, and to provide means whereby the pick-up fingers and associated parts may be conveniently repaired or inspected. Another object is to provide means for freeing the pick-up from clinging straws and vines as gathered grain is being delivered to the header conveyer, and also other means for causing the grain to be delivered nearer to the center of the conveyer and preventing grain and weeds from bunching or clogging on the conveyer at the rear of the pick-up, while still other advantages will appear.

In the accompanying drawings, forming part hereof, Figure 1 is a plan view of a header equipped with my improved pick-up; Fig. 2, a detail section of the pick-up taken on the dotted line 2—2 in Fig. 1; Figs. 3, 4 and 5, perspective views of parts of the device; Fig. 6, a detail section taken on the dotted line 6—6 in Fig. 2; Fig. 7, a detail view taken on the dotted line 7—7 in Fig. 6; Fig. 8, a plan view of the stripping fingers which I employ; and Fig. 9 is a perspective of a tool for disconnecting the finger guards.

In said drawings the numeral 5 indicates a header or other support of any desired construction having a conveyer 6 leading to a thrashing machine (not shown), the conveyer thereof being operated by a power shaft 7 or other means connected to the thrasher. To the forward part of the header I secure frame members 8 by which the pick-up is supported, which latter includes rear finger-guard members 10 connected to the lower ends of the frame members, at 11, and to the upper ends thereof, at 11', by deflectors 12 which are connected to said guards, at 13, the outer ends 14 of which deflectors are curved, Fig. 1, for a purpose to appear. One end of said guard members 10 is provided with a slot 15, Fig. 5, and its opposite end with a tongue 16, by which means similar outer guard members 18 embodying tongues and slots 19, 20, respectively, may be readily connected to said members 10, as indicated in Fig. 2, and disconnected by a tool 21, Fig. 9, and which members 10 and 18, constituting a continuous finger guard, may be further secured by a cotter-pin 22 or otherwise. By detachably connecting the guard members 10 and 18 I am enabled to quickly remove the latter member to obtain ready access to the interior of the pick-up for inspection, repairs and adjustments of its mechanisms, particularly its multiplicity of fingers, when clogged or impaired by weedy material or damaged by contact with obstructions in the field, which is of material importance both to the machinery operators and the grain grower in saving time and expense incident to frequent repairs of such devices as commonly constructed. To the deflectors 12 are secured stripping fingers 24 which, for simplicity of installation, may be of unitary pairs as indicated in Fig. 8 and secured, at 25, to a deflector, said stripping fingers being slightly downwardly curved in the direction of curvature of the deflectors and also in the direction of travel of the conveyer, as indicated in Figs. 1 and 8.

Through the finger guards described I extend a drive-shaft 28 eccentrically mounted in cams 29, one at each end of the pick-up, and fixedly secured to the header, as is common, said shaft preferably having blades 30 at its opposite sides and arranged longitudinally thereof, as indicated in Figs. 6 and 7, and at each end of the shaft is a spider 31 comprising arms 32, said spiders being cored, as at 33, to provide a grease reservoir for lubricating bearings. About medianly of shaft 28 a hub 35 is fixedly mounted within the finger guards, which supports a series of shafts 36 preferably extending alternately or in staggered relation from opposite sides thereof and supported at their outer ends in the arms 32, which method provides a substantial assemblage of said parts in unitary form, although if desired said shafts 36 may be of such length as to extend through the pick-up from end to end and supported by an appropriate medianly arranged hub, or the latter may be dispensed with in pick-up attachments of limited width. Upon shafts 36 a series of tines or fingers 37 are flexibly secured, as indicated in Fig. 3, by coiling them about a shaft, at 38, and fastening the coils thereto at 39, which fingers travel in the spaces 40 between the finger guards, all in a well known manner. At the outer end of each shaft 36 a quadrant 42 is fixedly secured by welding or otherwise, which embodies a series of radially spaced holes 43, and adjacent to said quadrant a roller-arm 44 is pivotally mounted on shaft 36, and is adjustably connected to the quadrant by a bolt 45 passing through one of the holes 43, so that when it is desired to change the position of the fingers 37 in relation to the ground this may be readily accomplished by removing bolt 45 and moving the roller-arm 44 so that a hole therein (not shown) may register with another of the holes 43 and the bolt reinserted, which adjustments will place the fingers 36 in the different positions indicated by the dotted lines in Fig. 2 and thus vary the pitch thereof. Roller arm 44 carries a revolving roller 46 which rides through the cam grooves 29' in cams 29, so that as shaft 28 is rotated by the chain 28' or other driving mechanism the assembly of shafts 36, hub 35 and spiders 31 will rotate as a unit, and through the influence of shaft 28, the cam 29 and roller 46 an eccentric throw of the fingers will result, as indicated in Fig. 2, wherein said fingers are seen to recede below the deflectors 12 in their rotation toward the header and again project through the finger guards.

In operation, as the header is advancing through the stubble, shaft 28 is driven to rotate the finger-bearing shafts 36 (the fingers being adjusted in the manner indicated to suit crop conditions) which carry the fingers around in the direction of the arrows, Fig. 2, causing said fingers to pick up the grain from the windrows and lift the same over onto the deflectors 12, from which it is deposited upon the stripper fingers 24 and the curved ends 14 of said deflectors, which disentangle and separate the material, and by reason of the curvature of the ends of the deflectors and also the stripper fingers a tossing motion is imparted to the material so that it will be discharged well toward the middle of the conveyor in substantially the direction of travel thereof, the accumulation of straws, weeds and the like near the forward edge of the conveyer will be prevented, and the efficiency of a pick-up for the purpose disclosed is thereby materially improved. By arranging the finger-bearing shafts in groups in staggered relation at opposite sides of the hub 35, as shown in Fig. 4, the rows of fingers comprising the groups are not in alignment, and therefore the impact of the pick-up moving through the windrow will be divided as the fingers of one group will advance into the material before those of the opposite group. It will be further understood that by providing shaft 28 with shallow fan blades, as 30, a slight air current is set up which accelerates flow of the material toward the conveyer and assists in clearing the spaces between the fingers and removing straw from the latter.

I claim as my invention:

1. In a pick-up for the purpose described, a finger-guard comprising an inner member and an outer member, and means for detachably connecting said members.

2. In a pick-up for the purpose described, a finger-guard comprising members detachably secured together, and means for supporting the guard on a harvester.

3. In a pick-up for harvesters, a series of spaced finger-guards comprising members detachably connected together, means for securing the guards to a harvester, rotary means comprising fingers so positioned within the guards that said fingers will travel therebetween, and means for actuating the rotary means.

4. In a pick-up for harvesters, a series of spaced finger-guards comprising members detachably secured together, a drive-shaft passing through the guards, a cam supporting each end of the shaft, means for rotating the shaft, spiders at each end of the drive shaft, and shafts having fingers thereon supported in the spiders said spiders and shafts being rotated by the driving shaft so that the fingers will travel between the spaced finger guards.

5. In a pick-up for harvesters, a series of spaced finger-guards, means for securing the guards to a harvester, a driving shaft passing through the guards, a cam supporting each end of the shaft, deflectors attached to the guards and extending toward the harvester, and stripper fingers connected to the pick-up and extending rearwardly toward the harvester.

6. In a pick-up for harvesters, a series of spaced finger-guards comprising members detachably secured together, means for securing the guards to a harvester, deflectors secured to the guards and extending rearwardly toward the harvester, a drive-shaft passing through the guards, means connected to and rotating with said drive-shaft including fingers adapted to travel between said guards, and stripper fingers associated with the deflectors for directing material onto the harvester.

7. In a pick-up for harvesters, a series of spaced finger-guards, means for securing the guards to a harvester, deflectors connected to the guards extending rearwardly toward the harvester and terminating in curved ends, and rotary means within the guards having fingers traveling therebetween for carrying gathered material to the deflector to be discharged therefrom to the harvester.

8. In a pick-up for a harvester embodying a conveyer, a series of spaced finger-guards, means for securing the guards to a harvester, rotary means within the guards having fingers traveling therebetween, deflectors secured to the guards and extending rearwardly to the harvester, and stripper fingers secured to the pick-up and curved in the direction of travel of the conveyer whereby material is discharged toward the middle of the latter.

9. In a pick-up for harvesters, a series of spaced finger-guards, means for securing the guards to a harvester, a shaft having a fan blade thereon passing through the guards, and rotary means mounted on the shaft and embodying fingers adapted to travel between the guards and mounted on said shaft.

10. In a pick-up for harvesters, a series of spaced guards, means for securing the guards to the harvester, and a shaft embodying a fan blade mounted within the guards for creating air currents through the spaces therebetween.

11. In a pick-up of the character described, a series of spaced finger-guards, a drive-shaft passing therethrough, a cam supporting each end of the shaft, spiders mounted on the shaft, groups of finger-bearing shafts supported in staggered relation by the spiders the fingers thereof traveling between the finger-guards, arms on said shafts having rollers traveling in said cams, and means for rotating the drive-shaft to drive said roller through the cams to impart gathering motion to the fingers.

12. In a pick-up of the character described, a series of spaced finger-guards, a shaft passing therethrough, a cam supporting each end of the shaft, arms having rollers adapted to travel in said cams, means for supporting the arms and having fingers thereon adapted to travel between the guards, and means for adjusting said arms for varying the pitch of said fingers.

13. In a pick-up of the character described, a series of spaced finger-guards, a drive-shaft passing through the guards, a hub mounted on said shaft, finger-bearing shafts mounted in the hub in staggered relation and extending laterally therefrom, means for supporting the opposite ends of said shafts, and means for actuating the drive-shaft to rotate said hub and carry the fingers around between the finger-guards.

14. In a pick-up of the character described, a series of spaced finger-guards composed of detachably connected members, a drive-shaft passing through the guards, a hub mounted on said shaft, finger-bearing shafts one end of each of which is mounted in the hub and extend laterally therefrom, means for supporting the opposite ends of said shafts, and means for actuating the drive-shaft to rotate said hub and carry the fingers on the finger-bearing shafts around between the finger-guards.

15. In a pick-up of the character described, a series of spaced finger-guards, a drive-shaft passing through the guards, cams having races therein supporting the ends of the drive-shaft, finger-bearing shafts mounted on the drive-shaft, means on the finger-bearing shafts carrying rollers adapted to travel in said cam races, and means for adjusting the roller carrying means to vary the pitch of the fingers on said shafts in relation to the ground.

16. In a pick-up of the character described, a series of spaced finger-guards, a drive-shaft passing through the guards, means in which the drive-shaft is eccentrically mounted, spiders on the drive-shaft, a hub on the shaft between said spiders, shafts mounted in the hub and spiders, fingers on said shafts adapted to travel between the spaced finger-guards, and means for adjusting the shafts to vary the pitch of the fingers thereon in relation to the ground.

17. In a pick-up of the character described, a finger-guard comprising an inner member having a slot in one end and its opposite end terminating in a tongue, and an outer member having a tongue at one end insertible in the slot of the inner member and a slot in its opposite end engageable by the tongue of said inner member.

18. In a pick-up for the purpose described, a finger-guard comprising members adapted to be separated for obtaining access into the interior of the pick-up, and means for connecting said members whereby they may be assembled to constitute a guard unit for guiding fingers.

19. In a pick-up of the character described, a driving shaft, a hub mounted on the shaft, a group of shafts having fingers thereon extending from one side of the hub, and a group of shafts having fingers thereon extending from the opposite side of the hub, said groups of shafts being arranged in staggered relation whereby when rotated the rows of fingers of one group will engage material in advance of the fingers of the other group.

20. In a pick-up of the character described, a frame, inner guard members connected to the frame, outer guard members, means for detachably securing each of said outer members to an inner member to form a guard unit, a rotary device in said guards having fingers adapted to travel between said guards, and means for rotating the device.

In testimony whereof I affix my signature.
WALLACE F. MacGREGOR.